(12) United States Patent
Ishiwata et al.

(10) Patent No.: US 8,845,781 B2
(45) Date of Patent: Sep. 30, 2014

(54) METHOD AND APPARATUS FOR MELTING ALUMINUM POWDER

(75) Inventors: Yasuo Ishiwata, Shizuoka (JP); Kazumi Tono, Shizuoka (JP); Yuji Suzuki, Shizuoka (JP); Akira Kato, Tokyo (JP); Kazuya Higashimura, Osaka (JP); Akiei Tanaka, Osaka (JP); Katsuya Moriguchi, Osaka (JP)

(73) Assignees: Toyo Aluminium Kabushiki Kaisha, Osaka-Shi (JP); Nippon Light Metal Company, Ltd., Tokyo (JP)

( * ) Notice: Subject to any disclaimer, the term of this patent is extended or adjusted under 35 U.S.C. 154(b) by 14 days.

(21) Appl. No.: 13/640,252

(22) PCT Filed: Apr. 18, 2011

(86) PCT No.: PCT/JP2011/059488
§ 371 (c)(1),
(2), (4) Date: Oct. 9, 2012

(87) PCT Pub. No.: WO2011/132628
PCT Pub. Date: Oct. 27, 2011

(65) Prior Publication Data
US 2013/0025414 A1    Jan. 31, 2013

(30) Foreign Application Priority Data

Apr. 23, 2010   (JP) .................................. 2010-100235

(51) Int. Cl.
C22B 21/00   (2006.01)
F27D 3/00    (2006.01)
F27D 27/00   (2010.01)
C22B 21/06   (2006.01)

(52) U.S. Cl.
CPC ............ *C22B 21/062* (2013.01); *F27D 3/0026* (2013.01); *F27D 3/0025* (2013.01); *F27D 27/00* (2013.01)
USPC ............................................... 75/680; 75/685

(58) Field of Classification Search
CPC ............................ C22B 21/062; C22B 21/064
USPC ...................................................... 75/685, 680
See application file for complete search history.

(56) References Cited

U.S. PATENT DOCUMENTS

| | | |
|---|---|---|
| 4,128,415 A | 12/1978 | van Linden et al. |
| 4,564,393 A | 1/1986 | Murray et al. |
| 4,648,901 A * | 3/1987 | Murray et al. .................. 75/684 |
| 6,398,844 B1 * | 6/2002 | Hobbs et al. .................... 75/585 |
| 2009/0050239 A1 | 2/2009 | Honda et al. |

FOREIGN PATENT DOCUMENTS

CN    101146645 A    3/2008
(Continued)

OTHER PUBLICATIONS

Schwartz, Harold. "ProKon" for aluminum. 1998.*

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

Provided are a method and an apparatus for melting an aluminum powder, which are capable of melting the aluminum powder with a high yield and allow the melted aluminum to be reused for a variety of applications. The method for melting the aluminum powder includes the steps of: preparing a mixture (M) including an aluminum powder (A) and a fluoride-based flux (F) by previously mixing the aluminum powder (A) and the fluoride-based flux (F); and melting the mixture (M) in molten aluminum (L).

8 Claims, 1 Drawing Sheet

(56) References Cited

FOREIGN PATENT DOCUMENTS

| | | | | |
|---|---|---|---|---|
| GB | 534871 | A * | 3/1941 | |
| JP | 59-47337 | A | 3/1984 | |
| JP | 61-243136 | A | 10/1986 | |
| JP | 7-248189 | A | 9/1995 | |
| JP | 10-176227 | A | 6/1998 | |
| JP | 10-226827 | A | 8/1998 | |
| JP | 3274931 | B2 | 4/2002 | |
| JP | 2006-291254 | A | 10/2006 | |
| WO | WO 2006/109810 | A1 | 10/2006 | |

* cited by examiner

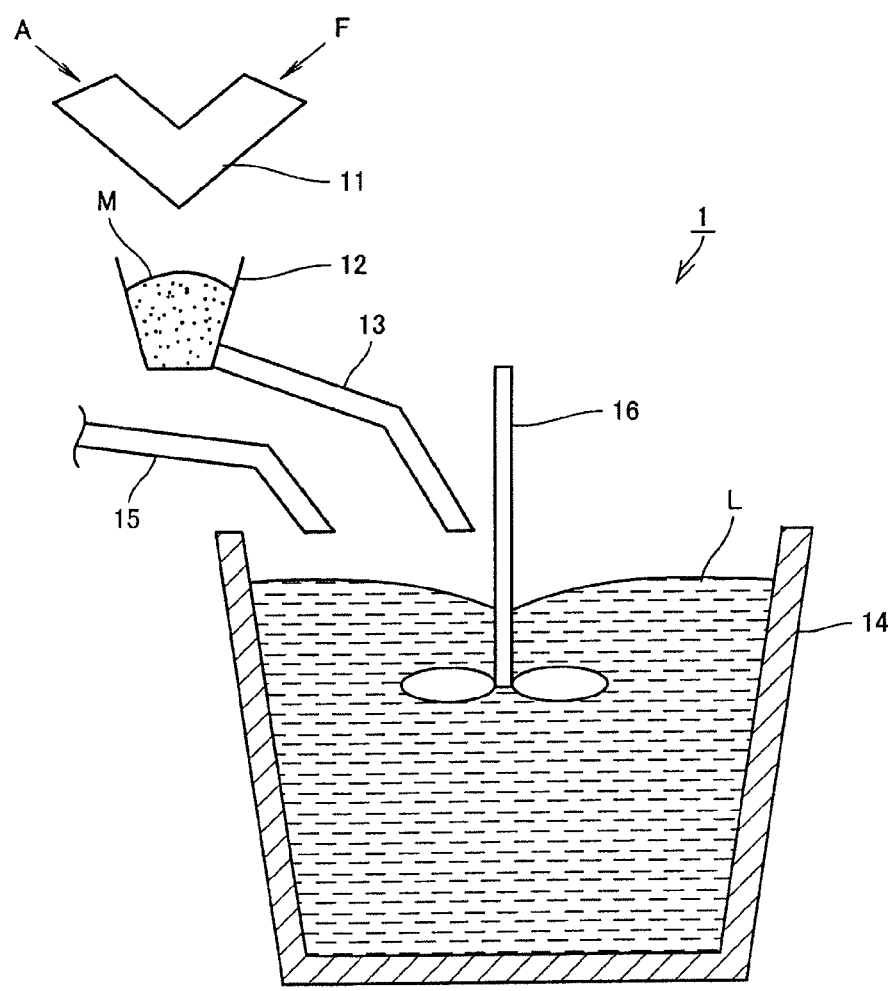

METHOD AND APPARATUS FOR MELTING ALUMINUM POWDER

TECHNICAL FIELD

The present invention relates to a method and an apparatus for melting an aluminum powder. In the present invention, a term "aluminum" refers to not only pure aluminum but also a variety of aluminum alloys.

BACKGROUND ART

Conventionally, an atomized aluminum powder is used as a material for a pigment, a paste for forming an electrode, and the like. Since a variation in particle diameters of the atomized aluminum powder is large, the atomized powder cannot be used as the above-mentioned materials as it is. Therefore, the atomized aluminum powder is sieved and thereafter, is used as the above-mentioned material. Accordingly, there arises a problem in that the aluminum powder which has been sieved out and dropped (in other words, whose particle sizes are greater than or equal to a predetermined particle size and/or less than or equal to a predetermined particle size) is wasted. Therefore, in order to reuse the aluminum powder which has been sieved out and dropped, various attempts such as an attempt of melting the atomized aluminum powder have been made. However, the attempt of the melting the atomized aluminum powder with a good yield and reusing the atomized aluminum powder cannot be carried out.

Japanese Patent No. 3274931 (hereinafter, referred to as Patent Literature 1) discloses an aluminum-cuttings melting furnace with which aluminum cuttings are melted by heat of a burner and a fixed quantity thereof is retained, and a flux treatment is involved therein. In general, the aluminum cuttings are a kind of an aluminum powder which is obtained upon subjecting an aluminum molded piece to a lathe process or a cutting process and whose each particle is flake-shaped or irregular-shaped. An average particle diameter thereof is comparatively large and a specific surface area is comparatively small.

CITATION LIST

Patent Literature

Patent Literature 1: Japanese Patent No. 3274931

SUMMARY OF THE INVENTION

Technical Problem

As compared with the aluminum cuttings processed in Patent Literature 1, an average particle diameter of an atomized aluminum powder widely distributed in the industrial community in general is small and a specific surface area thereof is considerably large. Even when it is attempted that such an atomized aluminum powder is melted by means of the melting furnace disclosed in Patent Literature 1, the atomized aluminum powder is hardly melted, thereby producing remnants due to the insufficient melting or dross (slag) due to oxidation. As the causes for this, it is mainly considered that the atomized aluminum powder floats on the molten aluminum; strong oxide film thereof is not easily broken or melted; and particles of the atomized aluminum powder are fused with one another and remain insufficiently melted to be masses.

Therefore, objects of the present invention are to solve the above-described problems and to provide a method and an apparatus for melting the aluminum powder, which allow the aluminum powder to be melted with a high yield and enable the melted aluminum to be reused for a variety of applications.

Solution to Problem

In order to solve the problems of the conventional technology, the present inventors have repeated eager researches. As a result, the present inventors found that the above-mentioned objects can be achieved by previously mixing an aluminum powder and a fluoride-based flux and thereafter, melting the mixture in molten aluminum. Based on these findings by the inventors, the present invention was produced.

A method for melting the aluminum powder according to the present invention includes the steps of: preparing a mixture including an aluminum powder and a fluoride-based flux by previously mixing the aluminum powder and the fluoride-based flux; and melting the mixture in molten aluminum.

In the method for melting the aluminum powder according to the present invention, it is preferable that at the melting step, while the molten aluminum is being agitated, the mixture is melted in the molten aluminum.

In addition, in the method for melting the aluminum powder according to the present invention, it is preferable that the fluoride-based flux includes: 25% by mass or more and 55% by mass or less of fluorine; 5% by mass or more and 20% by mass or less of aluminum; and 10% by mass or more and 50% by mass or less of potassium.

Furthermore, in the method for melting an aluminum powder according to the present invention, it is preferable that the fluoride-based flux includes $KAlF_4$ as a main component and a mass ratio of the aluminum with respect to the potassium in the fluoride-based flux is 0.35 or more and 0.70 or less.

In the method for melting the aluminum powder according to the present invention, it is preferable that the mixture includes 2% by mass or more and 15% by mass or less of the fluoride-based flux with respect to the whole mixture.

It is preferable that the method for melting the aluminum powder according to the present invention further includes a step of forming the mixture so as to be small masses.

It is preferable that the method for melting the aluminum powder according to the present invention further includes a step of supplying a cover gas to prevent oxidation of the molten aluminum.

In the method for melting an aluminum powder according to the present invention, it is preferable that an average particle diameter of the aluminum powder is one μm or more and 200 μm or less, and a content of contained oxygen is 0.05% by mass or more and 2.0% by mass or less.

An apparatus for melting the aluminum powder according to the present invention includes: means for preparing a mixture including an aluminum powder and a fluoride-based flux by previously mixing the aluminum powder and the fluoride-based flux; and means for dissolving the mixture in the molten aluminum.

It is preferable that the apparatus for melting the aluminum powder according to the present invention further includes means for agitating the molten aluminum.

In addition, it is preferable that the apparatus for melting the aluminum powder according to the present invention further includes means for forming the mixture so as to be small masses.

Furthermore, it is preferable that the apparatus for melting the aluminum powder according to the present invention further includes means for supplying a cover gas to prevent oxidation of the molten aluminum.

Advantageous Effects of the Invention

According to the present invention, since an aluminum powder can be melted with a high yield, the melted aluminum can be reused for a variety of applications. Accordingly, the present invention can contribute to resource saving.

BRIEF DESCRIPTION OF THE DRAWINGS

FIG. 1 is a diagram illustrating a schematic configuration of an apparatus for melting an aluminum powder as one embodiment according to the present invention.

DESCRIPTION OF EMBODIMENTS

A method for melting an aluminum powder according to the present invention includes the steps of: preparing a mixture including an aluminum powder and a fluoride-based flux by previously mixing the aluminum powder and the fluoride-based flux; and melting this mixture in molten aluminum.

Although the aluminum powder used in the present invention may be the heretofore known aluminum powder, in particular, an atomized aluminum powder manufactured by using an atomizing apparatus (molten metal atomizer) is preferable. It is preferable that an average particle diameter of the aluminum powder (a value measured by using a laser diffraction type particle size distribution meter) is one through 200 µm; it is further preferable that the average particle diameter thereof is 5 through 100 µm; and it is more further preferable that the average particle diameter thereof is 10 through 75 µm. If the average particle diameter of the aluminum powder is less than one µm, there arise problems, for example, in that powder dust is caused during handling of the aluminum powder, it takes time to evenly mix the aluminum powder with the fluoride-based flux, and aluminum is likely to burn. If the average particle diameter of the aluminum powder exceeds 200 µm, although no particular inconvenience is caused, when cost is taken into account, no particular merit is brought about. Although a specific surface area of the aluminum powder (a value measured by employing a BET one-point method) is not particularly limited, it is preferable that the specific surface area thereof is 0.1 through 5.0 $m^2/g$. It is preferable that a content of contained oxygen of the aluminum powder (a value measured by employing an inert gas fusion/infrared absorption method) is 0.05% through 2.0% by mass.

Most of the oxygen contained in the aluminum powder is present in a surface and forms firm oxide coating film. Therefore, when the mixture including the aluminum powder and the fluoride-based flux, prepared by previously mixing the aluminum powder and the fluoride-based flux, is charged into the molten aluminum, the aluminum powder with the fluoride-based flux contacting or neighboring the surface of the aluminum powder comes to be charged into the molten aluminum. This causes the oxide coating film to be broken or causes the oxygen to be removed from the surface of the aluminum powder, thereby melting a metallic aluminum component in the aluminum powder into the molten aluminum with a good yield. The removed oxygen reacts with the flux and is isolated and removed as slag.

It is preferable that the fluoride-based flux used in the present invention includes compounds consisting of fluorine, aluminum, and potassium, such as $KAlF_4$ and $K_3AlF_6$, and mass fractions of the fluorine, the aluminum, and the potassium in the fluoride-based flux are 25% through 55%, 5% through 20%, and 10% through 50%, respectively. When the fluoride-based flux is constituted of only the fluorine, the aluminum, and the potassium, the total of the respective mass fractions is 100% and does not exceed 100%. However, when the total of the mass fractions of the fluorine, the aluminum, and the potassium is less than 100%, other elements, for example, hydrogen, oxygen, silicon, titanium, cesium, and the like are present in the fluoride-based flux.

Further preferably, a main component of the fluoride-based flux used in the present invention is $KAlF_4$ (whose content in the fluoride-based flux is 50% by mass or more). By adjusting a mass ratio of the aluminum to the potassium in the fluoride-based flux so as to be 0.35 through 0.70, a melting point of the fluoride-based flux can be made 1000° C. or less, thereby enabling preferable embodiment. For example, a fluoride-based flux having mixed composition of $KAlF_4:K_3AlF_6$: $K_2AlF_5.H_2O=70:15:7$ (mass ratio) or $KAlF_4:K_3AlF_6=60:35$ (mass ratio) is commercially available, and such a fluoride-based flux having the above-mentioned mixed composition can be preferably used. Mass fractions of fluorine, aluminum, and potassium in the former fluoride-based flux are 45%, 14%, and 29%, respectively, and a mass ratio of the aluminum to the potassium is 0.49. Mass fractions of fluorine, aluminum, and potassium in the latter fluoride-based flux are 46%, 14%, and 35%, respectively, and a mass ratio of the aluminum to the potassium is 0.40. Each of the former and the latter is a fluoride-based flux having mixed composition within a range which allows the present invention to be preferably embodied. The fluoride-based flux may include small contents of $TiO_2$, $AlF_3$, $SiO_2$, and the like (it is preferable that each of the contents in the flux is 5% by mass or less). In addition, the fluoride-based flux is required only to be a powder, and its particles may be irregular-shaped for instance, and can be melted after the mixing with the aluminum powder.

The aluminum powder and the fluoride-based flux can be mixed by means of the heretofore known mixer and by employing the heretofore known mixing method. For example, the mixing can be conducted by using a mixer such as a rotating mixer, a rocking mixer, a tumbler mixer, a V-blender, a drum blender, a ribbon mixer, a vibrating mill, a ball mill, and satellite mill. Although the mixing may be conducted through either dry blending or wet blending, the dry blending is preferable since in the case of the wet blending, a drying step is required. Although an atmosphere in which the mixing is conducted may be an air atmosphere, in view of safety, an atmosphere such as an atmosphere of an argon gas, an atmosphere of a nitrogen gas, an atmosphere of carbon dioxide, a vacuum atmosphere, and an atmosphere of a reduced-oxygen gas (for example, a reduced-oxygen gas obtained by reducing a concentration of oxygen of air to 10% by volume or less or preferably, to 8% by volume or less) is preferable. Although a mixing time may be appropriately adjusted, the mixing time may be approximately one through 180 minutes.

As to mixture fractions of the aluminum powder and the fluoride-based flux, it is preferable that a content of the fluoride-based flux with respect to the whole mixture is 2 through 15% by mass and it is further preferable that the content thereof is 3 through 12% by mass. If the content of the fluoride-based flux is less than 2% by mass, insufficiency for the removal of the oxygen being present in the aluminum powder is likely to be caused. If the content of the fluoride-based flux exceeds 15% by mass, not only cost is increased but also a larger quantity of slag than necessary is likely to be generated.

In a case where an average particle diameter of the aluminum powder is 10 μm or less, it is preferable that the mixture of the aluminum powder and the fluoride-based flux is formed so as to be small masses. By forming the mixture so as to be small masses, powder dust of the aluminum powder is prevented from being generated, and the aluminum powder does not float on the molten aluminum and can be easily charged into the molten aluminum. As a method and an apparatus for forming the mixture so as to be small masses, the heretofore known method and apparatus may be adopted, and for example, a roller compactor (manufactured by Kurimoto, Ltd.), a briquetting machine (manufactured by SINTOKO-GIO, LTD.), and other various cold forming apparatuses, a granulating machine, and the like may be used. Although a size of each of the small masses is not particularly limited, it is preferable that as the size thereof, a total of dimensions of a length, a width, and a height (length+width+height) is approximately 3 through 300 mm.

It is preferable that when the mixture of the aluminum powder and the fluoride-based flux is charged into the molten aluminum, the molten aluminum is in an agitated state rather than in a static state. The molten aluminum is agitated, thereby allowing the above-mentioned mixture to be dispersed in the molten aluminum without floating on the molten aluminum and efficiently melting the aluminum powder. As a method and an apparatus for agitating the molten aluminum, the heretofore known method and apparatus such as a propeller shaft method, a gas bubbling method, an electromagnetic induction agitating method, a molten metal pump method can be adopted. For example, in order to conduct agitation in which the propeller shaft method and the electromagnetic induction agitating method are combined, two or more kinds of the agitating methods and agitating apparatuses can be used in combination.

It is preferable that in order to avoid entangling of air in the molten metal upon the agitating, a gas such as an argon gas, a nitrogen gas, carbon dioxide, and a reduced-oxygen gas is caused to flow on the molten metal. It is preferable that upon causing the gas to flow, the gas is caused to flow at a flow rate of approximately 5 through 500 L/minute. It is also possible to make the melting apparatus (furnace) enclosed-type. In this case, an inside of the apparatus may be in an atmosphere of the argon gas, the nitrogen gas, the carbon dioxide, the reduced-oxygen gas, or the vacuum. In either case of the flow-type apparatus or the enclosed type apparatus, it is preferable that an oxygen concentration above the molten aluminum is 10% by volume or less and preferably, 8% by volume or less. By controlling the oxygen concentration so as to be 10% by volume or less, an explosion of the powder dust and an inadvertent event of a fire can be suppressed. As described above, a cover gas for preventing oxidation of the molten aluminum is supplied, thereby allowing the explosion and combustion of the powder dust of the aluminum powder to be prevented from occurring.

As a means for charging the mixture of the aluminum powder and the fluoride-based flux into the molten aluminum, although when a quantity of the mixture is small, manpower may be employed, ordinarily, the heretofore known feeder such as an electromagnetic feeder, a screw feeder, a powder conveyance pump, a vibrating feeder, a rotary valve, and an ultrasonic feeder can also be utilized. Of course, the supply of the mixture by means of the feeder can also be electronically controlled, and in accordance with a use of the molten aluminum (a decrease in the molten metal), the mixture can also be appropriately supplied.

Although a temperature of the molten aluminum is not particularly limited if the aluminum is in a melted state, ordinarily, the temperature of approximately 660° C. through 1000° C. (though depending on alloy components) is preferable and the temperature at which the above-mentioned fluoride-based flux is melted is set. As a method for heating the molten aluminum, the heretofore known method such as an electromagnetic induction heating method (a low-frequency induction heating method and a high-frequency induction heating method), a burner heating method, a radiation heating method, and an electrical resistance heating method can be adopted. As a material of the melting apparatus (furnace material), the heretofore known material can be adopted, and description of this material is omitted since the material is not important in the present invention.

Next, with reference to FIG. 1, one embodiment of an apparatus 1 for melting the aluminum powder, according to the present invention, will be described. As a means for mixing an aluminum powder A and a fluoride-based flux F and thereby preparing a mixture including the aluminum powder A and the fluoride-based flux F, in the present embodiment, a V-blender 11 is adopted as shown in FIG. 1. The mixture M is prepared and thereafter, the mixture M is temporarily retained in a hopper 12, and a predetermined quantity of the mixture M is charged into molten aluminum L which has been previously heated and melted in a heating furnace 14 by a vibrating feeder 13. The vicinity of a surface of the molten aluminum L is in a state agitated by a propeller shaft 16 as an agitator and concurrently, an argon gas or the like is supplied to the surface of the molten aluminum by a cover gas supply pipe 15. Though not shown in FIG. 1, an originating end of the cover gas supply pipe 15 is connected to a gas cylinder or a gas generator, and the like. The mixture M charged into the molten aluminum L is agitated by the propeller shaft 16, whereby the mixture is dispersed in the molten aluminum L without floating on the molten aluminum L; due to action of the fluoride-based flux F, oxide coating film of the aluminum powder A is broken or oxygen is removed from the aluminum powder A, and a metallic aluminum component in the aluminum powder A is going to be melted in the molten aluminum L. The obtained molten aluminum (the molten aluminum having the aluminum powder melted therein) is used to be cast to ingots or used for manufacturing an atomized aluminum powder by using an atomizing apparatus again, thereby allowing the obtained molten aluminum to be provided for a variety of the heretofore known manufacturing industries using aluminum.

By using the method and the apparatus for melting the aluminum, according to the present invention as described above, it is made possible to melt the aluminum powder with a good yield. Since the melted aluminum can be reused for a variety of applications, the present invention contributes to resource saving. In addition, the present invention enables the melting of fine aluminum powder (whose average particle diameter is 200 μm or less), which has been conventionally impossible. Furthermore, since the present invention is constituted of the comparatively simple steps and apparatus, the aluminum powder can be recycled at a low cost. In the present invention, since the fluoride-based flux is mainly used, a harmful chlorine gas is hardly generated. In addition, the cover gas is used in the present invention, thereby allowing the explosion and combustion of the powder dust of the aluminum powder to be prevented.

EXAMPLES

Hereinafter, by using examples, instances of the verification of effects of the present invention will be described. However, each of the examples is merely one example of the present invention, and the technical scope of the present invention is not limited by the examples.

Example 1

One hundred kg of an atomized aluminum powder (having a metal aluminum purity of 99.7% by mass (a purity in a case where a metal content with an oxygen content excluded is 100%), an average particle diameter of 30 μm, a content of contained oxygen of 0.37% by mass, and a specific surface area of 0.41 m$^2$/g) and seven kg of a fluoride-based flux ($KAlF_4$:$K_3AlF_6$: $K_2AlF_5.H_2O$=70:15:7 (mass ratio)) were mixed by means of a drum blender for 30 minutes. The obtained mixture was charged little by little into 350 kg of molten aluminum (seed molten aluminum) (having a molten aluminum temperature of 850° C.) having a purity of 99.7% by mass, which had been previously heated and melted by means of a low-frequency induction heating furnace (500 kW) having a capacity of 500 kg. Upon the charging, an argon gas was sprayed to the vicinity of a surface of the molten aluminum at a flow rate of 70 L/minute. The molten aluminum was wholly kept in an agitated state by means of a propeller shaft-type agitating machine (whose number of revolutions is 30 rpm).

Example 2

One hundred kg of an atomized aluminum powder (having a metal aluminum purity of 99.7% by mass (a purity in a case where a metal content with an oxygen content excluded is 100%), an average particle diameter of 10 μm, a content of contained oxygen of 0.43% by mass, and a specific surface area of 0.65 m$^2$/g) and 10 kg of a fluoride-based flux ($KAlF_4$: $K_3AlF_6$:$K_2AlF_5.H_2O$=70:15:7 (mass ratio)) were mixed by means of a drum blender for 30 minutes. Thereafter, the obtained mixture was subjected to cold compression molding by means of a briquetting machine (manufactured by SINTOKOGIO, LTD.) so as to be small masses, each of which has a size of approximately 20 mm×20 mm×40 mm. The obtained compressed-compacts were charged little by little into 350 kg of molten aluminum (seed molten aluminum) (having a molten aluminum temperature of 850° C.) having a purity of 99.7% by mass, which had been previously heated and melted by means of a gas burner furnace having a capacity of 500 kg. Upon the charging, a nitrogen gas was sprayed to the vicinity of a surface of the molten aluminum at a flow rate of 50 L/minute. The molten aluminum was wholly kept in an agitated state by means of a propeller shaft-type agitating machine (whose number of revolutions is 30 rpm).

Comparison Example 1

One hundred kg of an atomized aluminum powder (having a metal aluminum purity of 99.7% by mass (a purity in a case where a metal content with an oxygen content excluded is 100%), an average particle diameter of 30 μm, a content of contained oxygen of 0.37% by mass, and a specific surface area of 0.41 m$^2$/g) was charged little by little into 350 kg of molten aluminum (seed molten aluminum) having a purity of 99.7% by mass, which had been previously heated and melted by means of a low-frequency induction heating furnace (500 kW) having a capacity of 500 kg. Upon the charging of the atomized aluminum powder, a nitrogen gas was sprayed to the vicinity of a surface of the molten aluminum at a flow rate of 50 L/minute. The molten aluminum was wholly in an agitated state due to action of electromagnetic induction.

Comparison Example 2

An atomized aluminum powder (having a metal aluminum purity of 99.7% by mass (a purity in a case where a metal content with an oxygen content excluded is 100%), an average particle diameter of 10 μm, a content of contained oxygen of 0.43% by mass, and a specific surface area of 0.65 m$^2$/g) was subjected to cold compression molding by means of a briquetting machine (manufactured by SINTOKOGIO, LTD.) so as to be small masses, each of which has a size of approximately 20 mm×20 mm×40 mm. Ten kg of the obtained compressed-compacts were charged little by little into ten kg of molten aluminum (seed molten aluminum) having a purity of 99.7% by mass, which had been previously heated and melted by means of a high-frequency induction heating furnace having a capacity of 50 kg. Upon the charging of the obtained compressed-compacts of the atomized aluminum powder, an argon gas was sprayed to the vicinity of a surface of the molten aluminum at a flow rate of 30 L/minute. The molten aluminum was wholly in an agitated state due to action of electromagnetic induction.

Comparison Example 3

One hundred kg of an atomized aluminum powder (having a metal aluminum purity of 99.7% by mass (a purity in a case where a metal content with an oxygen content excluded is 100%), an average particle diameter of 30 μm, a content of contained oxygen of 0.37% by mass, and a specific surface area of 0.41 m$^2$/g) was charged little by little into 350 kg of molten aluminum (seed molten aluminum) (having a molten aluminum temperature of 850° C.) having a purity of 99.7% by mass, which had been previously heated and melted by means of an electromagnetic induction heating furnace (500 kW) and subsequently, the molten aluminum was subjected to a flux treatment by using one kg of a chloride based flux (whose main component is KCl). Upon the charging of the atomized aluminum powder, a nitrogen gas was sprayed to the vicinity of a surface of the molten aluminum at a flow rate of 90 L/minute. The molten aluminum was wholly kept in an agitated state by means of a propeller shaft-type agitating machine (30 rpm).

With respect to each of the examples and comparison examples, a yield (yield rate) was calculated by using the following Equation 1. The result of the calculation is shown in Table 1.

$$(Yield)=\{(WF-WM)/WA\}\times 100 \qquad \text{Equation 1}$$

In Equation 1, WF represents a weight (kg) of the whole molten aluminum obtained after the aluminum powder had been melted (however, not including the isolated and removed slag), WM represents a weight (kg) of the molten aluminum (seed molten aluminum) which had been previously heated and melted before the aluminum powder was melted, and WA represents a weight (kg) of the atomized aluminum powder.

TABLE 1

| | Yield (%) | Remarks |
|---|---|---|
| Example 1 | 94.2 | Favorable molten aluminum, which was similar to seed molten aluminum, having little foreign matter was obtained. |
| Example 2 | 93 | Favorable molten aluminum, which was similar to seed molten aluminum, having little foreign matter was obtained. |

TABLE 1-continued

| | Yield (%) | Remarks |
|---|---|---|
| Comparison Example 1 | 35 | An aluminum powder was burnt, thereby forming oxides, and the formed oxides were present in a coagulated manner on a surface of molten aluminum. |
| Comparison Example 2 | 81 | A large amount of sherbet-like dross (an unmelted aluminum power + oxides) was present in molten aluminum and it was impossible to isolate the dross. |
| Comparison Example 3 | 84 | A large amount of sherbet-like dross (an unmelted aluminum power + oxides) was present in molten aluminum. |

It is seen from Table 1 that in each of the examples 1 through 2, it was made possible to melt the aluminum powder with a good yield, as compared with the comparison examples 1 through 3. In addition, it is seen therefrom that it was made possible to melt the fine aluminum powder (whose average particle diameter is 200 µm or less), which had conventionally been impossible.

The described embodiments and examples are to be considered in all respects only as illustrative and not restrictive. It is intended that the scope of the invention is, therefore, indicated by the appended claims rather than the foregoing description of the embodiments and examples and that all modifications and variations coming within the meaning and equivalency range of the appended claims are embraced within their scope.

INDUSTRIAL APPLICABILITY

Since by using a method and an apparatus for melting aluminum according to the present invention, an aluminum powder can be melted with a high yield, the molten aluminum can be reused for a variety of applications. Accordingly, the present invention can contribute to resource saving.

REFERENCE SIGNS LIST

1: aluminum powder melting apparatus, 11: V-blender, 12: hopper, 13: vibrating feeder, 14: heating furnace, 15: cover gas supply pipe, 16: propeller shaft, A: aluminum powder, F: fluoride-based flux, M: mixture, L: molten aluminum.

The invention claimed is:

1. A method for melting an aluminum powder, comprising the steps of:
   preparing a mixture (M) which consists of an aluminum powder (A) and a fluoride-based flux (F) by previously mixing the aluminum powder (A) and the fluoride-based flux (F);
   charging the mixture (M) in molten aluminum (L); and
   melting the charged mixture (M) in the molten aluminum (L).

2. The method for melting an aluminum powder according to claim 1, wherein in the melting step, while the molten aluminum (L) is being agitated, the mixture (M) is melted in the molten aluminum (L).

3. The method for melting an aluminum powder according to claim 1, wherein the fluoride-based flux (F) includes: 25% by mass or more and 55% by mass or less of fluorine; 5% by mass or more and 20% by mass or less of aluminum; and 10% by mass or more and 50% by mass or less of potassium.

4. The method for melting an aluminum powder according to claim 1, wherein the fluoride-based flux (F) includes $KAlF_4$ as a main component and a mass ratio of the aluminum with respect to the potassium in the fluoride-based flux (F) is 0.35 or more and 0.70 or less.

5. The method for melting an aluminum powder according to claim 1, wherein the mixture (M) includes 2% by mass or more and 15% by mass or less of the fluoride-based flux (F) with respect to the mixture (M).

6. The method for melting an aluminum powder according to claim 1, further comprising a step of forming the mixture (M) so as to be small masses.

7. The method for melting an aluminum powder according to claim 1, further comprising a step of supplying a cover gas to prevent oxidation of the molten aluminum (L).

8. The method for melting an aluminum powder according to claim 1, wherein an average particle diameter of the aluminum powder (A) is one µm or more and 200 µm or less, and a content of contained oxygen is 0.05% by mass or more and 2.0% by mass or less.

* * * * *